C. J. BRITT.
GROUND ENGAGING DRIVE WHEEL.
APPLICATION FILED FEB. 13, 1920.

1,390,875.

Patented Sept. 13, 1921.

WITNESS:

Charles J. Britt
INVENTOR.
BY
Victor J. Evans
ATTORNEY.

UNITED STATES PATENT OFFICE.

CHARLES JOSEPH BRITT, OF WILLINGTON, SOUTH CAROLINA.

GROUND-ENGAGING DRIVE-WHEEL.

1,390,875.  Specification of Letters Patent.   Patented Sept. 13, 1921.

Application filed February 13, 1920. Serial No. 358,345.

*To all whom it may concern:*

Be it known that I, CHARLES J. BRITT, a citizen of the United States, residing at Willington, in the county of McCormick and State of South Carolina, have invented new and useful Improvements in Ground-Engaging Drive-Wheels, of which the following is a specification.

One object of my present invention is the provision of an advantageously constructed ground-engaging drive wheel, designed more particularly, though not necessarily, for embodiment in the traction engine constituting the subject of my application filed April 15, 1918, Serial Number 228,709.

Another object of the invention is the provision of a peculiar and advantageous mounting for the wheel.

To the attainment of the foregoing, the invention consists in the improvement as hereinafter described and definitely claimed.

In the accompanying drawings, hereby made a part hereof;

Similar numerals of reference designate corresponding parts in all of the views of the drawings.

Figure 1:
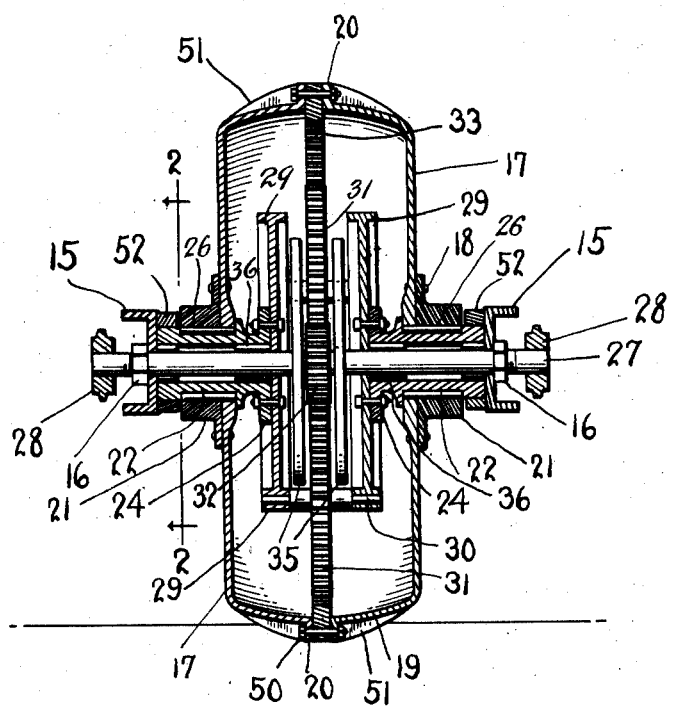
Figure 1 is a vertical section, with the gears 31 and the pinion 32 in edge elevation illustrating my novel ground-engaging drive wheel and the manner in which the same is mounted between frame bars.

Among other elements the construction illustrated includes sleeves 22.

Connected securely with the flange 24 at the inner end of each sleeve 22, is a frame 29 here shown. The frames 29 afford bearings for a plurality of shafts 30. Each shaft 30 supports a gear wheel 31, each of said gear wheels being in mesh with a pinion 32 fixed on the axle 27, and each of said gear wheels being also in mesh with an internal gear wheel 33 which is comprised in the casing of the wheel, as hereinafter set forth. It follows that when the axle 27 is rotated by power received from the motor through the spur gears 28 fixed on the axle, motion will be transmitted through the gears 32 and 31 to the internal gear 33, thereby causing rotation of the wheel. The axle 27 is shown as being provided with fly wheels or balance wheels 35, the same being located adjacent to the frames 29. Anti-friction rollers 36 are interposed between the axle 27 and the sleeve 22 through which the axle extends, and anti-friction rollers 26 are interposed between the sleeves 22 and the hub portions 21 of the wheel through which the sleeves extend.

At 15 are the side members of the frame of a traction engine or the like, and at 16 are nuts threaded on the axle 27, and bearing against the outer sides of the frame members 15.

In addition to the internal gear 33 and the hub portions 21, the ground-engaging driving wheel comprises casing sections 17, bolted at 18 to flanges on the hub portions 21, and having peripheral portions 19 on which are outwardly directed flanges 20. The said sections 17 are preferably of sheet steel, and the flanges 20 are arranged at opposite sides of and are securely connected through the medium of transverse bolts 50 to the internal gear 33. It will thus be apparent that the gear 33 and the sections 17 each carries the other, and that they are connected together rigidly in a strong and durable manner. It will also be apparent that the flanges 20 and the gear 33 form an efficient circumferential tread portion that may be depended upon to sink into the ground and adequately prevent lateral deflection of the wheel.

Figure 3:
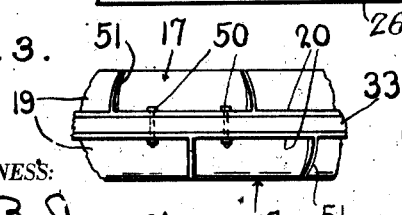
Fig. 3 is a detail plan illustrative of the peculiar tread of my novel wheel.

By comparison of Figs. 1 and 3, it will be noted that the tread portions 19 of the wheel are provided with webs 51 arranged transversely of the tread, at opposite sides of the projecting tread portion and in staggered relation. These webs 51 are adapted to bite into the ground and thereby contribute to the tractive capacity of the wheel.

Figure 2:
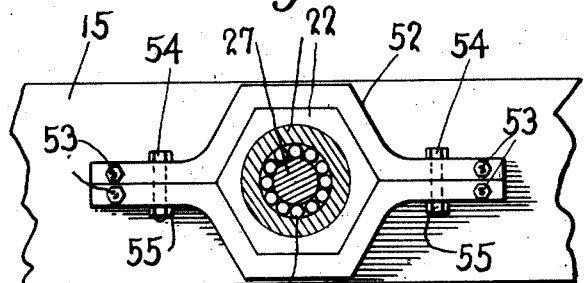
Fig. 2 is a section taken in the plane indicated by the line 2—2 of Fig. 1, looking outwardly.

Arranged at inner sides of the frame bars 15 are yoke members 52 in which are supported the outer ends of the sleeves 22. The said yoke members 52 are connected at 53 to the frame bars 15, and are also connected together through the medium of bolts 54 and nuts 55 on said bolts, as clearly appears in Fig. 2. After the axle 27 is withdrawn endwise and the lower yoke members 52 of the pairs are disconnected from the upper members and from the frame bars 15, the wheel may be dropped, and when the axle 27 is withdrawn endwise and the upper members 52 are disconnected from the lower members and from the frame bars 15, the wheel may be raised. Again by withdrawing the axle 27 and disconnecting all of the yoke members 52 the wheel may be expeditiously and easily removed from the frame. It will also be observed that the outer end portions of the sleeves 22 are of such a diameter that they are capable of being moved endwise through the hub portions 21 of the wheel.

Having described my invention, what I claim and desire to secure by Letters-Patent, is:

1. In a ground-engaging drive wheel, the combination of hub portions, a vertical central annular member, and casing sections joined to the hub portions and having inwardly directed tread portions and outwardly directed flanges thereon opposed to and connected with the annular member.

2. In a ground-engaging drive wheel, the combination of a longitudinal central annular member, and casing sections each having inwardly directed tread portions connected to the annular member.

3. A ground-engaging drive wheel comprising an annular member having internal gear teeth, hub portions, and casing sections joined to the hub portions and having inwardly directed tread portions on which are flanges joined to the annular member.

4. The combination of spaced frame bars, sleeves arranged with their outer ends in opposed relation to the inner sides of said bars, an axle extending through the bars and the sleeves, sectional bearing means detachably connected together and to the frame bars and in which the outer ends of the sleeves are disposed, a wheel comprising an annular internal gear, hub portions surrounding the sleeves, and casing sections interposed between and joining the hub portions and the annular gear, and a driving connection, within the wheel, intermediate of the axle and the internal gear.

In testimony whereof I affix my signature.

CHARLES JOSEPH BRITT.